United States Patent
Murayama

(10) Patent No.: US 7,477,361 B2
(45) Date of Patent: Jan. 13, 2009

(54) RANGE IMAGE PRODUCING METHOD AND APPARATUS FOR IMAGE TAKING

(75) Inventor: Jin Murayama, Miyagi (JP)

(73) Assignee: Fijifilm Corporation, Tokyo (JP)

( * ) Notice: Subject to any disclaimer, the term of this patent is extended or adjusted under 35 U.S.C. 154(b) by 0 days.

(21) Appl. No.: 11/889,815

(22) Filed: Aug. 16, 2007

(65) Prior Publication Data

US 2008/0043218 A1    Feb. 21, 2008

(30) Foreign Application Priority Data

Aug. 18, 2006 (JP) ............................ 2006-223431

(51) Int. Cl.
    *G01C 3/08* (2006.01)
    *H04N 9/64* (2006.01)

(52) U.S. Cl. ..................... 356/4.01; 382/106; 348/246

(58) Field of Classification Search ....... 356/4.01–4.07, 356/5.01–5.15; 382/103, 106, 107; 348/241, 348/246, 367

See application file for complete search history.

(56) References Cited

U.S. PATENT DOCUMENTS

| | | | |
|---|---|---|---|
| 6,057,909 A | | 5/2000 | Yahav et al. |
| 6,642,960 B1 * | | 11/2003 | Kohashi et al. ............. 348/246 |
| 6,856,355 B1 | | 2/2005 | Ray et al. |
| 7,012,642 B1 * | | 3/2006 | Zell ............................ 348/246 |
| 7,092,018 B1 * | | 8/2006 | Watanabe ................... 348/247 |
| 7,106,421 B2 * | | 9/2006 | Matsuura et al. ........... 356/4.01 |
| 7,352,395 B2 * | | 4/2008 | An ............................. 348/247 |
| 2006/0044546 A1 * | | 3/2006 | Lewin et al. ............... 356/4.04 |

FOREIGN PATENT DOCUMENTS

| | | |
|---|---|---|
| JP | 11-508359 A | 7/1999 |
| JP | 2001-215110 A | 8/2001 |

* cited by examiner

*Primary Examiner*—Isam Alsomiri
(74) *Attorney, Agent, or Firm*—Birch, Stewart, Kolasch & Birch, LLP

(57) ABSTRACT

An apparatus for image taking includes a range image sensor, in which a range image is produced in which a distance is represented with a pixel value by image taking of a principal object from an image taking position. An image pickup device receives light reflected by the principal object, to output an image signal for respective pixels. A light reception control unit changes over a reception sequence and reception time, and causes the image pickup device to output image signals associated with first and second distance ranges. The second distance range is a distance range where the principal object exists and is over the first distance range. A first range image and second range image, are formed according to the image signals. Blank portions are designated within the second range image by comparison of the first range image and second range image, to compensate for the blank portions.

11 Claims, 7 Drawing Sheets

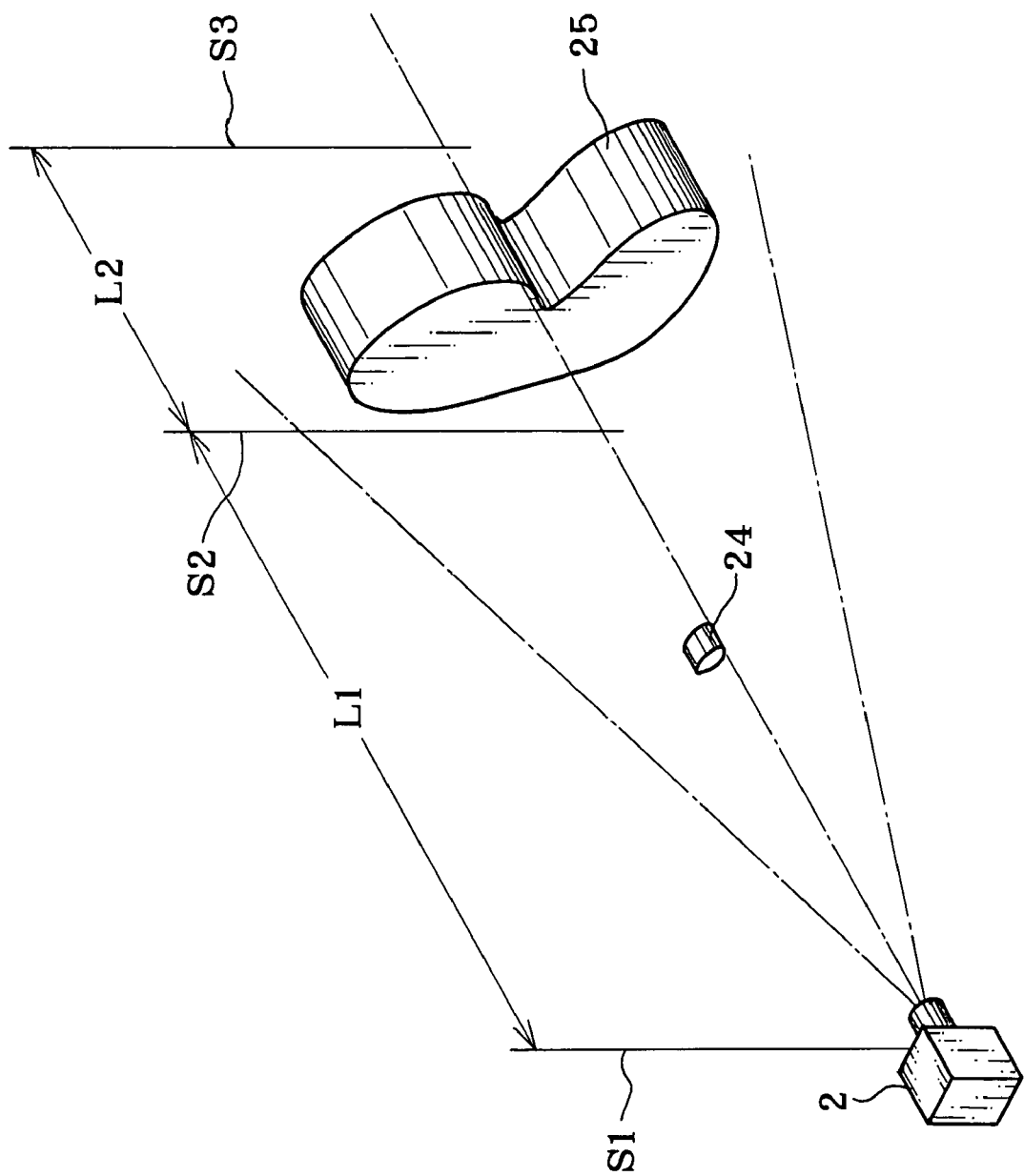

RANGE IMAGE PRODUCING METHOD AND APPARATUS FOR IMAGE TAKING

BACKGROUND OF THE INVENTION

1. Field of the Invention

The present invention relates to a range image producing method, and apparatus for image taking. More particularly, the present invention relates to a range image producing method, and apparatus for image taking in which precision in measuring a distance can be high by suitably compensating for blank portions in a range image.

2. Description Related to the Prior Art

The time-of-flight method (TOF method) is known as optical measurement of a distance to an object. In the TOF, inspection light is applied to the object. The time of flight of the light is measured, namely the time from the emission until the light reception from the object. A distance to the object is determined according to the time of the flight.

A range image sensor and an apparatus for image taking having the range image sensor are known in the art of the rangefinding. The range image sensor forms a range image in which a distance to the object is expressed by a pixel value. For example, U.S. Pat. No. 6,057,909 (corresponding to JP-A 11-508359) discloses the range image sensor in which infrared pulsed light is applied to the object, and reflected infrared light from the object is received by an image pickup device. The range image is acquired according to time from the application to the reception and pixel values of the image signal. Also, U.S. Pat. No. 6,856,355 (corresponding to JP-A 2001-215110) discloses a type of the range image sensor in which infrared light is modulated by sine wave modulation, and is applied to the object. Reflected infrared light from the object is received by an image pickup device by 1/n shift of the phase, so as to acquire the range image.

Also, a chroma key method is known, in which the object in a field of view is extracted by separation from the background. In the chroma key method, color of the background is kept the blue color, so only the object of the foreground is extracted according to chroma components of the image. However, there is a shortcoming in that the preparation of the background color requires much time and work. The color of the object on the foreground is limited in relation with the blue color. It is conceivable that the range image sensor described above is used to extract an image in a distance range being predetermined. The use of the range image sensor makes it possible to extract an image in the distance range by use of a sequence and time of light reception according to the distance range for light reception of the light reflected by the object.

It is likely that blank portions are created locally in the extraction of an image in the distance range with the range image sensor, to lower the quality of the image. The occurrence of the blank portions is characteristically led by local portions in the blank portions with low reflectance to infrared rays. A signal level for the range image may be too low and hardly discernible from electric noise owing to insufficiency in the S/N ratio.

It is possible to compensate for the blank portions by use of pixels of portions in an image around the blank portions. However, compensation of all of the blank portions is not effective, because a certain object may intervene between the distance range and an image taking position to create one of the blank portions. No known technique can treat the blank portions in a suitable manner.

SUMMARY OF THE INVENTION

In view of the foregoing problems, an object of the present invention is to provide a range image producing method, and apparatus for image taking in which precision in measuring a distance can be high by suitably compensating for blank portions in a range image.

In order to achieve the above and other objects and advantages of this invention, a range image producing method produces a range image in which a distance is represented with a pixel value by image taking of a scene containing a principal object from an image taking position with an image pickup device. In the range image producing method, light modulated at a predetermined period to the scene is applied. A first distance range and a second distance range are determined, wherein the first distance range is from an image taking position to a point short of the principal object, and the second distance range is a distance range defined by eliminating the first distance range from a range between the image taking position and the principal object. The light reflected by an object located in a first distance range is received with the image pickup device in a reception sequence and reception time according to the first distance range, to output a first image signal. The light reflected by the principal object is received with the image pickup device in a reception sequence and reception time according to the second distance range, to output a second image signal. A first range image and a second range image are received according to respectively the first and second image signals. Blank portions within the second range image are designated by comparison of the first and second range images, to compensate for the blank portions for forming the range image.

The blank portions are portions derived from low reflectance in the principal object.

The range image forming step includes a) extracting a first closed region disposed in the first range image and having a closed contour. b) Closed region data of information of a position and form of the first closed region are generated. c) A second closed region disposed in the second range image and having a closed contour is extracted. d) Blank portions from the second closed region are determined. e) The blank portions are compared with the closed region data, to designate a blank portion unrelated with the closed region data. f) The blank portion unrelated with the closed region data is compensating for.

The first closed region is derived from a small object in a micro size located in the first distance range.

In the light applying step, infrared rays are emitted, and the first and second range images are photographed by response to the infrared rays.

Furthermore, the scene is photographed with a visible light image pickup device, to form a visible light image. An image of the principal object is extracted from the visible light image according to the second range image.

Also, an apparatus for image taking is provided, and produces a range image in which a distance is represented with a pixel value by image taking of a scene containing a principal object from an image taking position with an image pickup device. A light source applies light modulated at a predetermined period to the scene. A light reception control unit changes over a reception sequence and reception time between a first receiving condition for a first distance range and a second receiving condition for a second distance range in a scanning period of one frame, to cause the image pickup device to output first and second image signals associated with the first and second receiving conditions, wherein the first distance range is from an image taking position to a point short of the principal object, and the second distance range is a distance range defined by eliminating the first distance range from a range between the image taking position and the principal object. An image forming unit forms a first range image and a second range image according to respectively the first and second image signals. An image processor designates blank portions within the second range image by comparison of the first and second range images, to compensate for the blank portions for forming the range image.

The image processor includes a closed region extractor for extracting a first closed region disposed in the first range image and having a closed contour, and a second closed region disposed in the second range image and having a closed contour. A data generator generates closed region data of information of a position and form of the first closed region. A blank determiner determines blank portions from the second closed region. A comparison unit compares the blank portions with the closed region data, to designate a blank portion unrelated with the closed region data. A compensator compensates for the blank portion unrelated with the closed region data among the blank portions.

The light source includes an infrared light emitting diode, and the image pickup device is an infrared image pickup device for image taking in response to infrared rays.

Furthermore, an apparatus for image taking is provided, and includes an image taking lens for focusing light from a scene containing a principal object. A visible light image pickup device receives the light from the scene, to output a visible image signal by photoelectric conversion. A light source applies infrared rays modulated at a predetermined period to the scene. Path splitting optics are disposed between the image taking lens and the visible light image pickup device. An infrared image pickup device is disposed in a light path of split of the path splitting optics, for carrying out photoelectric conversion of the infrared rays reflected by the object in the scene, to output an infrared image signal. A light reception control unit changes over a reception sequence and reception time between a first receiving condition for a first distance range and a second receiving condition for a second distance range in a scanning period of one frame, to cause the infrared image pickup device to output first and second infrared image signals associated with the first and second receiving conditions, wherein the first distance range is from an image taking position to a point short of the principal object, and the second distance range is a distance range defined by eliminating the first distance range from a range between the image taking position and the principal object. An image forming unit forms a visible light image according to the visible image signal, and forms a first range image and a second range image according to respectively the first and second infrared image signals. An image processor designates blank portions within the second range image by comparison of the first and second range images, to compensate for the blank portions for forming the range image. A visible light image extractor extracts an image from the visible light image according to the second range image.

Also, a range image sensor is provided, in which a range image is produced in which a distance is represented with a pixel value by image taking of a principal object from an image taking position. A light source applies light modulated at a predetermined period to the principal object. An image pickup device carries out photoelectric conversion by reception of the light reflected by the principal object, to output an image signal for respective pixels. A light reception control unit changes over a reception sequence and reception time between a first receiving condition for a first distance range and a second receiving condition for a second distance range in a scanning period of one frame, to cause the image pickup device to output first and second image signals associated with the first and second receiving conditions, wherein the second distance range is a distance range where the principal object exists and is over the first distance range. An image forming unit forms a first distance range and a second range image according to respectively the first and second image signals. An image processor designates blank portions within the second range image by comparison of the first distance range and the second range image, to compensate for the blank portions.

Additionally, a computer executable program is provided, in which a range image is produced, in which a distance is represented with a pixel value by image taking of a principal object from an image taking position. The computer executable program includes a program code for applying light modulated at a predetermined period to a principal object. A program code is for carrying out photoelectric conversion by reception of the light reflected by an object located in a first distance range in a reception sequence and reception time according to the first distance range, to output a first image signal for respective pixels. A program code is for carrying out photoelectric conversion by reception of the light reflected by the principal object in a reception sequence and reception time according to a second distance range, to output a second image signal for respective pixels, wherein the second distance range is a distance range where the principal object exists and is over the first distance range. A program code is for forming a first distance range and a second range image according to respectively the first and second image signals. A program code is for designating blank portions within the second range image by comparison of the first distance range and the second range image, to compensate for the blank portions.

Accordingly, precision in measuring a distance can be high by suitably compensating for blank portions in a range image, because a first distance range short of a principal object is utilized, and a small object in a micro size located in the first distance range can be eliminated from consideration of the principal object picked up in a second range image or acquired range image.

BRIEF DESCRIPTION OF THE DRAWINGS

The above objects and advantages of the present invention will become more apparent from the following detailed description when read in connection with the accompanying drawings, in which:

FIG. 4 is a perspective view illustrating a principal object and a small object to be photographed;

DETAILED DESCRIPTION OF THE PREFERRED EMBODIMENT(S) OF THE PRESENT INVENTION

Figure 1:
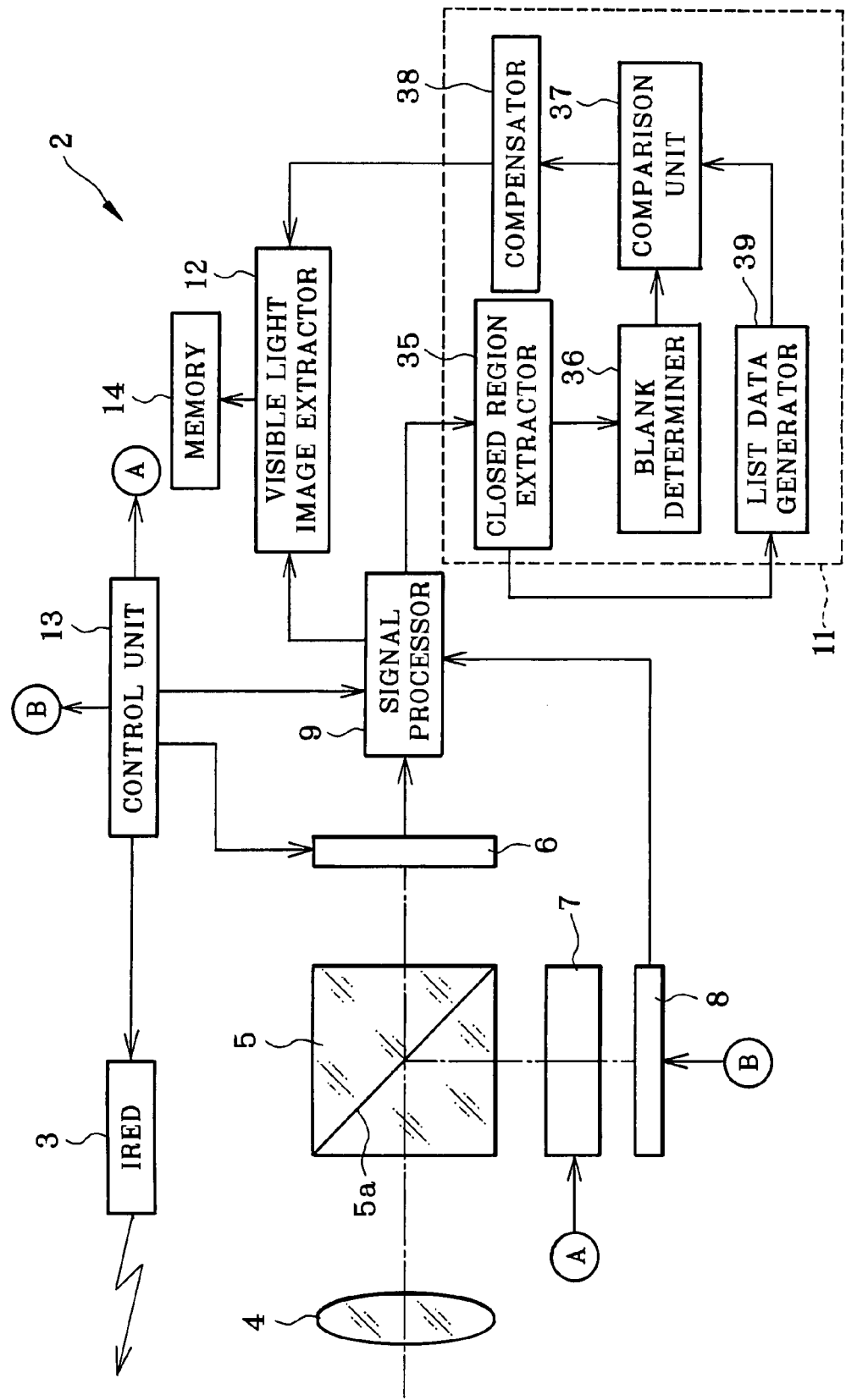
FIG. 1 is a block diagram schematically illustrating an apparatus for image taking.

In FIG. 1, an apparatus for image taking 2 of the invention includes an infrared light emitting diode (IRED) 3 as light source, an image taking lens 4, a prism 5 as optics to split a path, a visible light image pickup device 6 or CCD image sensor, a high speed shutter 7, an infrared image pickup device 8 or CCD image sensor, a signal processor 9 for image forming, an image processor 11, a visible light image extractor 12, a control unit 13, and a memory 14. The apparatus for image taking 2 creates an object image of an object located within a predetermined distance range. A range image sensor of the invention is constituted by the IRED 3, the high speed shutter 7, the infrared image pickup device 8, the signal processor 9, the image processor 11 and the control unit 13.

The IRED 3 is a light source of the TOF type of range image sensor, is controlled by the control unit 13, modifies infrared radiation and applies the infrared radiation to an object. The image taking lens 4 focuses any of infrared light and external light reflected by the object.

A tilted surface 5a is included in the prism 5. A multi layer interference filter is formed on the tilted surface 5a, and transmits visible light, and reflects infrared light. Visible light as a component included in the passed light through the image taking lens 4 travels straight to come incident upon the visible light image pickup device 6. Infrared light as another component is reflected by the tilted surface 5a, passes the high speed shutter 7 and comes incident upon the infrared image pickup device 8.

The visible light image pickup device 6 receives visible light and outputs a visible image signal by photoelectric conversion. The infrared image pickup device 8 receives infrared light and outputs an infrared image signal by photoelectric conversion. An example of the visible light image pickup device 6 and the infrared image pickup device 8 is CCD. Note that a C-MOS type of image pickup device may be used instead of the CCD.

Figure 2A:
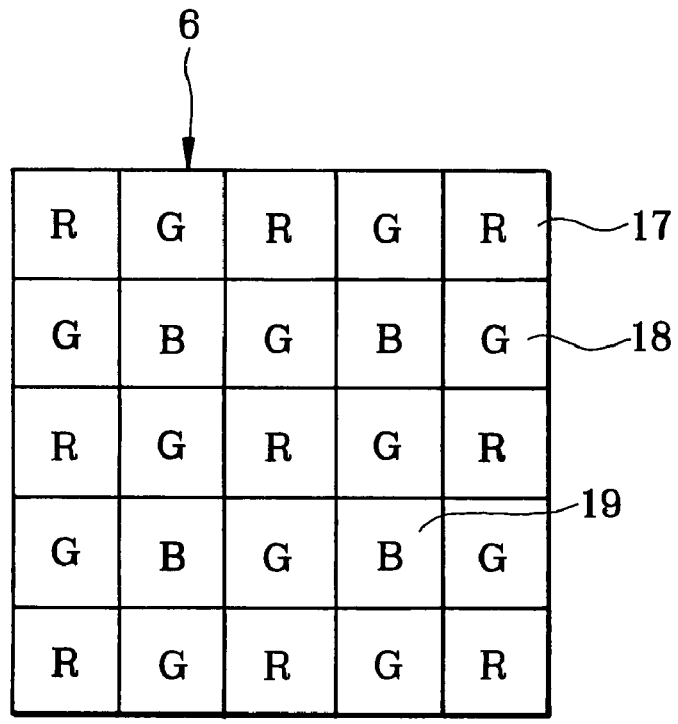
FIG. 2A is an explanatory view illustrating arrangement of red, green and blue pixels.

In FIG. 2A, the visible light image pickup device 6 includes red (R) pixels 17, green (G) pixels 18 and blue (B) pixels 19 arranged regularly in two dimensions as a matrix. Each of the red, green and blue pixels 17, 18 and 19 is constituted by a photo sensor, a color filter and a micro lens. The photo sensor receives light and converts the light photoelectrically. The color filter is disposed over the photo sensor, and is any one of red, green and blue color filters which transmit red, green and blue light. The micro lens condenses the incident light to direct on the photo sensor.

Figure 3:
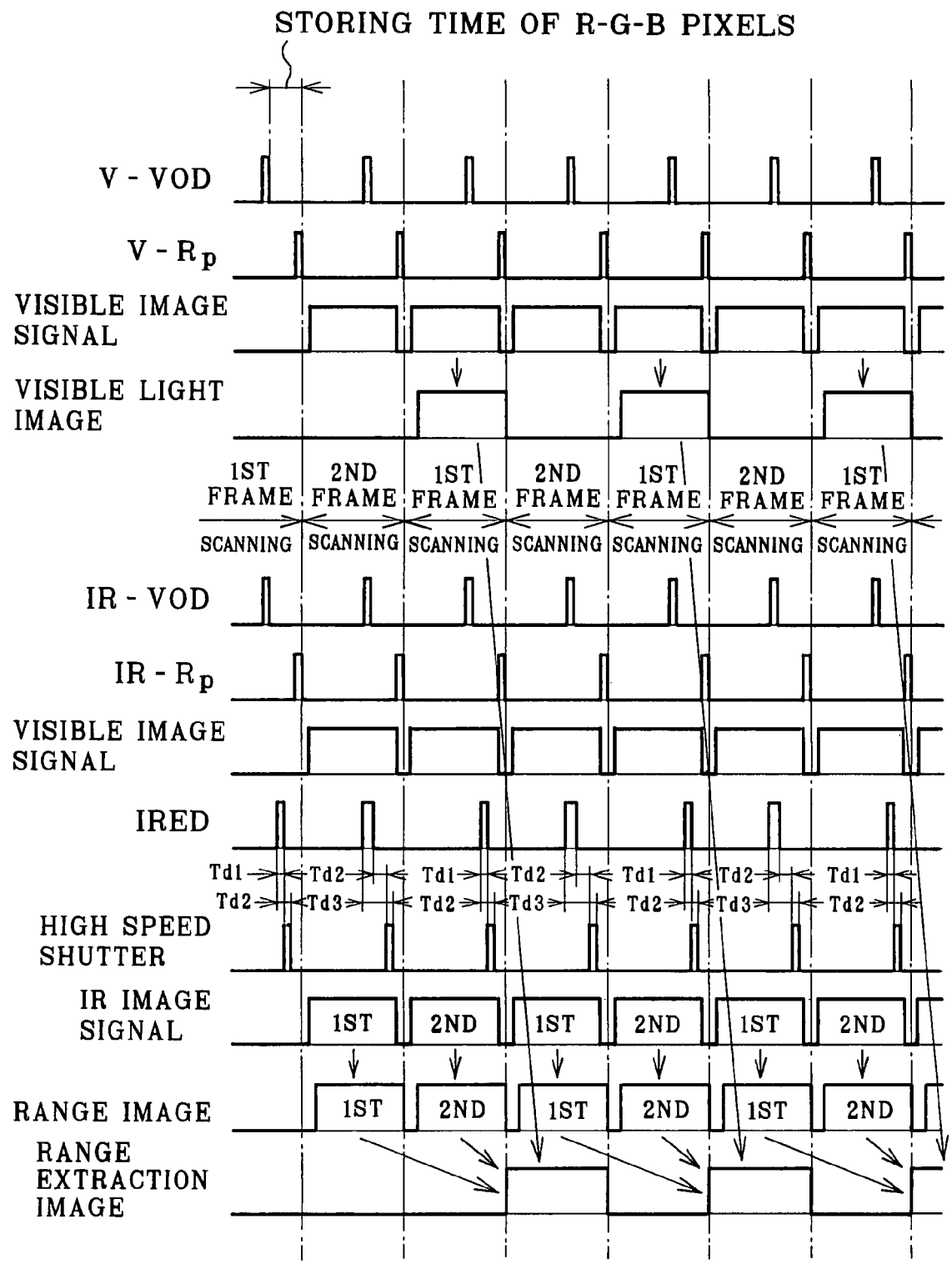
FIG. 3 is a timing chart illustrating operation of image pickup devices.

In FIG. 3, electric charge in the visible light image pickup device 6 is discharged at the red, green and blue pixels 17, 18 and 19 by use of the electronic shutter pulse V-VOD. After this, the visible light image pickup device 6 reads the stored charge by use of the reading pulse V-Rp again from the respective pixels, and outputs a visual image signal. The time of storing charge of the red, green and blue pixels 17, 18 and 19 is constant time from the V-VOD pulse to the V-Rp pulse. An interval of the V-Rp pulse is time of image pickup of one frame.

Figure 2B:
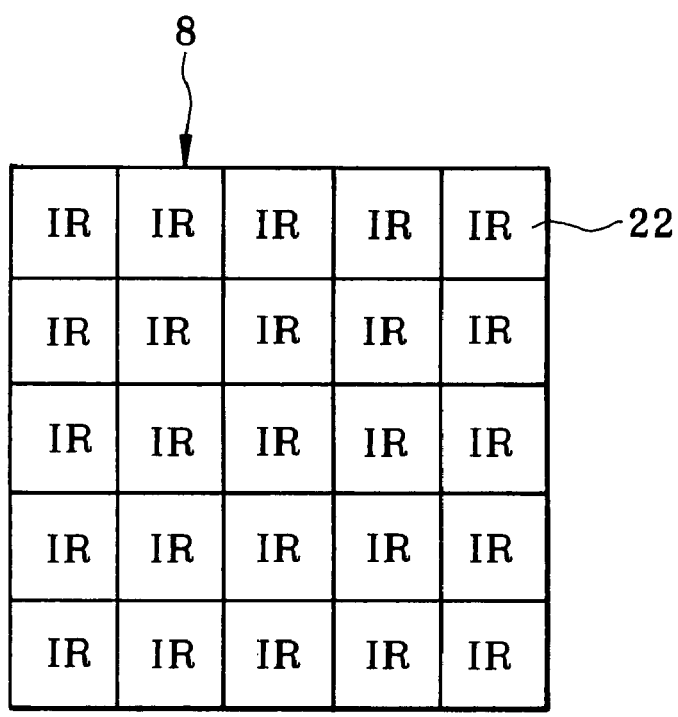
FIG. 2B is an explanatory view illustrating arrangement of infrared pixels.

In FIG. 2B, a plurality of infrared (IR) pixels 22 are included in the infrared image pickup device 8, and correspond to the red, green and blue pixels 17, 18 and 19 of the visible light image pickup device 6. Each of the IR pixels 22 is constituted by a photo sensor, an IR filter and a micro lens. The photo sensor receives light and converts the light photoelectrically. The IR filter is disposed over the photo sensor, and transmits infrared light.

Examples of the high speed shutter 7 are an electro optical shutter, image intensifier or the like. The high speed shutter 7 is controlled by the control unit 13 to open and close in a predetermined sequence of time, to transmit or intercept light from the prism 5 toward the infrared image pickup device 8. The high speed shutter 7 is closely combined with the control unit 13.

The control unit 13 adjusts the sequence and time of emission of the IRED 3 relative to opening and closing of the high speed shutter 7 according to the predetermined distance range. Let L be a distance to an object. Let T be time taken for forward and backward traveling of infrared light. Let c be speed of light. There is a relationship of the condition L=cT/2. According to the relationship, the control unit 13 determines the sequence and time of emission of the IRED 3 associated with the distance range. Thus, infrared light reflected by an object located in the distance range becomes incident upon the infrared image pickup device 8.

In FIG. 3, the infrared image pickup device 8 discharges electric charge stored in the IR pixels 22 by use of the electronic shutter pulse IR-VOD. After this, the infrared image pickup device 8 reads the stored charge by use of the reading pulse IR-Rp again from the respective pixels, and outputs IR image signal. The IRED 3 is caused to illuminate between the IR-VOD pulse and the IR-Rp pulse. The high speed shutter 7 is driven to open and close between the emission of the IRED 3 and the IR-Rp pulse. So the time of storing the charge in each of the IR pixels 22 is the time of opening and closing the high speed shutter 7.

In FIG. 4, the apparatus for image taking 2 photographs a small object in a minute size or first object 24, and a principal object or second object 25. The second object 25 is located farther from the first object 24 with respect to the apparatus for image taking 2. The purpose of the apparatus for image taking 2 is to form an image having only the second object 25. Various data are input to the control unit 13, including a distance to the second object 25 from the image taking position S1, a region of location of the second object 25 and the like. A distance range is defined between the second object 25 and the image taking position S1 where the apparatus for image taking 2 is placed. Examples of the distance ranges are the second distance range L2 of location of the second object 25 and the first distance range L1 defined from the image taking position S1 to the second distance range L2. The control unit 13 determines a sequence and time of emission of the IRED 3 according to the first and second distance ranges L1 and L2.

In FIG. 3, the image pickup of the infrared image pickup device 8 is periodical in an alternated sequence of the first frame scanning for image pickup in the first distance range L1 and the second frame scanning for image pickup in the second distance range L2.

In the first frame scanning, the IRED 3 is operated according to the sequence and time determined by the control unit 13, and illuminates in such a manner that the high speed shutter 7 opens at the lapse of delay time Td1 from the end of illumination, and that the high speed shutter 7 closes at the lapse of delay time Td2 from the start of illumination. The delay time Td1=0 so as to receive infrared light reflected by an object directly in front of the apparatus for image taking 2. The delay time Td2 corresponds to time of incidence of infrared rays reflected at the nearest point S2 of the second distance range L2. Thus, the infrared image pickup device 8 outputs the infrared image signal according to the distance range L1.

In the second frame scanning, the IRED 3 is operated according to the sequence and time determined by the control unit 13, and illuminates in such a manner that the high speed shutter 7 opens at the lapse of delay time Td2 from the end of illumination, and that the high speed shutter 7 closes at the lapse of delay time Td3 from the start of illumination. The delay time Td3 corresponds to time of incidence of infrared rays reflected at the farthest point S3 of the second distance range L2. Thus, the infrared image pickup device 8 outputs a second infrared image signal according to the second distance range L2.

Figure 5A:
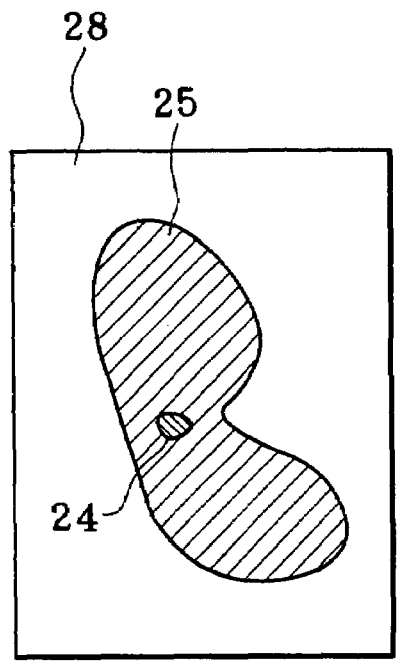
FIGS. 5A-5D are explanatory views illustrating a process of forming a range image.

The signal processor 9, which constitutes an image generator and a range image generator, produces visible light image as a normal image from the visible image signal in the second frame scanning as a portion included in the visible image signal generated by the visible light image pickup device 6. A visible light image 28 is an image obtained by image taking of the small object or first object 24 and the principal object or second object 25 in FIG. 4. The visible light image 28 is in a form of the first and second objects 24 and 25 overlapped on one another. See FIG. 5A.

Figure 5B:
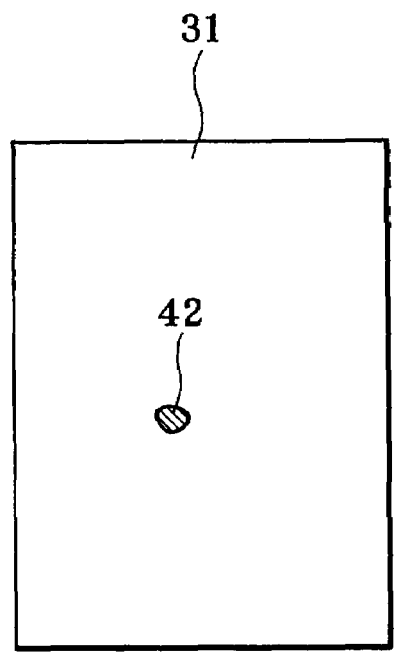
Figure 5C:
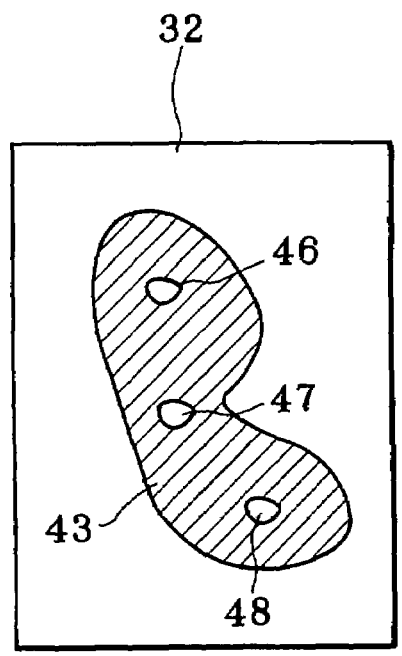

The signal processor 9 creates first and second range images in relation to the first and second distance ranges L1 and L2 from the first and second infrared image signals generated by the infrared image pickup device 8. In FIG. 5B, a first range image 31 is constituted by information of only the small object or first object 24. In FIG. 5C, a second range image 32 is constituted by information of a form of the principal object or second object 25 from which an overlapped portion of the small object or first object 24 is eliminated.

Note that there is a reason of using the visible image signal of the second frame scanning to produce a visible light image. In the visible light image extractor 12, the second range image 32 produced by image taking in the second frame scanning is used to extract an image of the second distance range L2 from the visible light image 28.

The visible light image created by the signal processor 9 is sent to the visible light image extractor 12. Also, the first and second range images 31 and 32 are input to the image processor 11. The image processor 11 includes a closed region extractor 35, a blank determiner 36 or missing portion determiner, a comparison unit 37, a compensator 38 and a list data generator 39. The image processor 11 produces a modified form of the second range image 32 without blanks by processing the first and second range images 31 and 32.

The closed region extractor 35 extracts a closed region from the first or second range image 31 or 32 as a region of which a contour is closed. In FIGS. 5B and 5C, a closed region 42 is extracted from the first range image 31 to represent a contour of the small object or first object 24. A closed region 43 is extracted from the second range image 32 to represent a contour of the second object 25.

The blank determiner 36 searches blanks from extracted closed regions as lack of data, and designates positions and shapes of blanks. In FIG. 5C, three blank portions or missing portions 46, 47 and 48 exist in the second range image 32, and are designated by the blank determiner 36.

The comparison unit 37 for evaluation designates a target blank among the blank portions 46-48 of the second range image 32. There are two types of blanks. A first type is derived from a portion of an object with a low reflectance. A second type is derived from an unexpected object located between the image taking position and the distance range. In the comparison unit 37, only the first type is designated which is due to low reflectance of a portion of an object among the blank portions 46-48.

The comparison unit 37 evaluates blanks designated by the blank determiner 36 by comparison with closed region list data, and specifies blanks not corresponding to closed regions in the closed region list data. Note that closed region list data is attribute data of an extracted closed region. The closed region list data is created by the list data generator 39 after the evaluation in the comparison unit 37. Thus, no closed region list data exists before the comparison of the first range image 31. For the second range image 32, comparison is carried out with the closed region list data of the first range image 31. At least one of the blank portions 46-48 in the second range image 32 that is derived from the closed region 42 of the first range image 31 is eliminated. For example, the blank portion 47 among the blank portions 46-48 of FIG. 5C is eliminated from target blanks because of coincidence with the closed region 42 in FIG. 5B in relation to the position and shape.

Figure 5D:
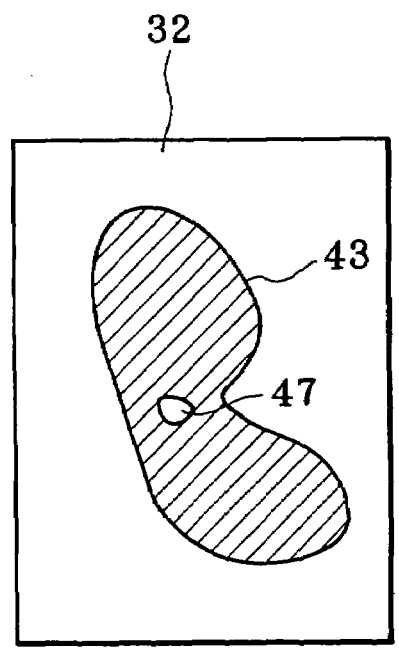

The compensator 38 compensates for the blank portions 46 and 48 designated by the comparison unit 37. An example of method of the compensation is to use pixel values in the blank portions 46 and 48 by means of pixel values of portions adjacent to the blank portions 46 and 48. In FIG. 5D, the blank portions 46 and 48 are compensated for. The blank portion 47 remains without compensation. Information of the second range image 32 after this is sent to the image processor 11.

The visible light image extractor 12 extracts pixels from the visible light image 28 associated with the second range image 32 input by the image processor 11, and creates a range extraction image associated with the second distance range. The range extraction image is written to the memory 14.

Figure 6:
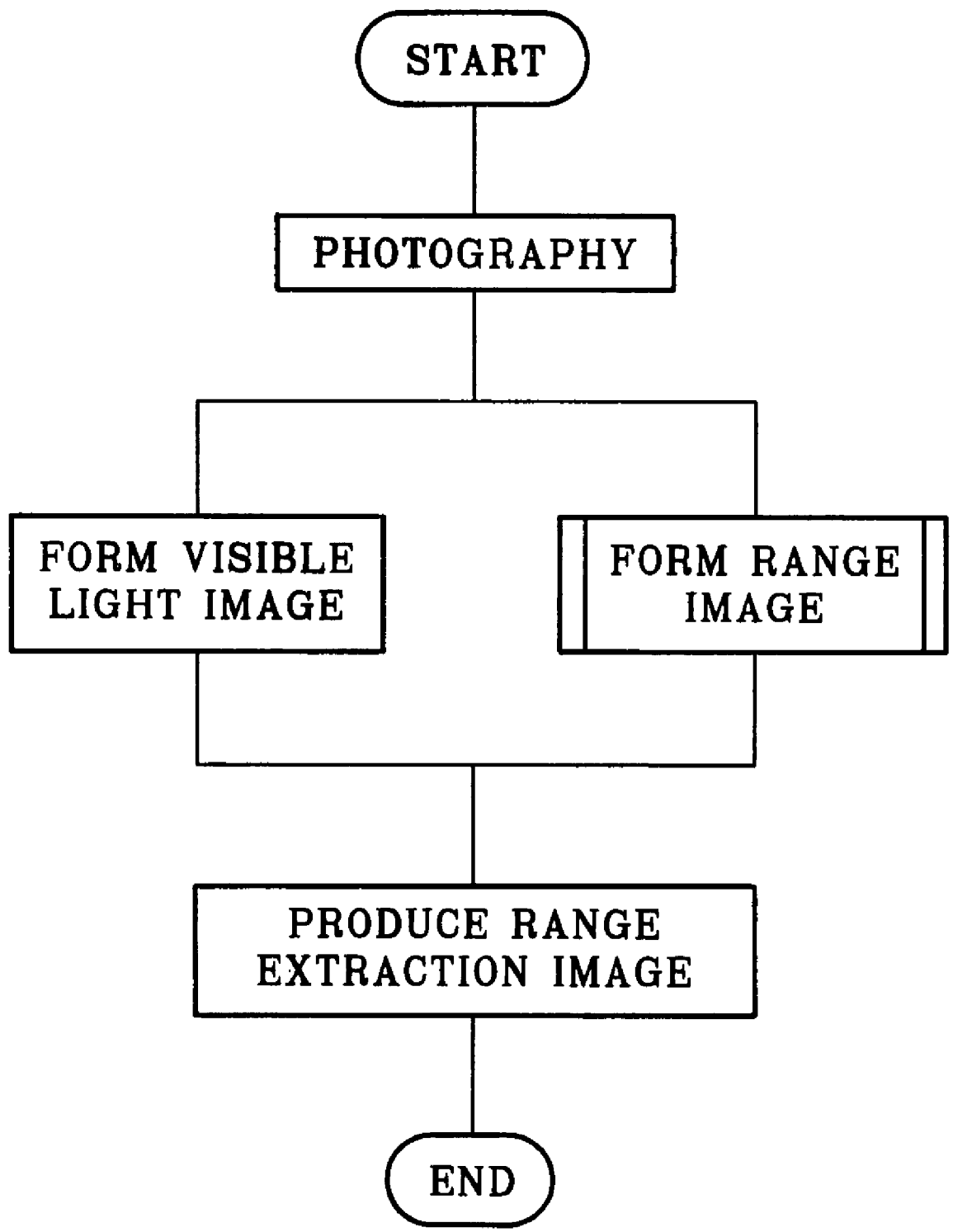
FIG. 6 is a flow chart illustrating image taking steps.
Figure 7:
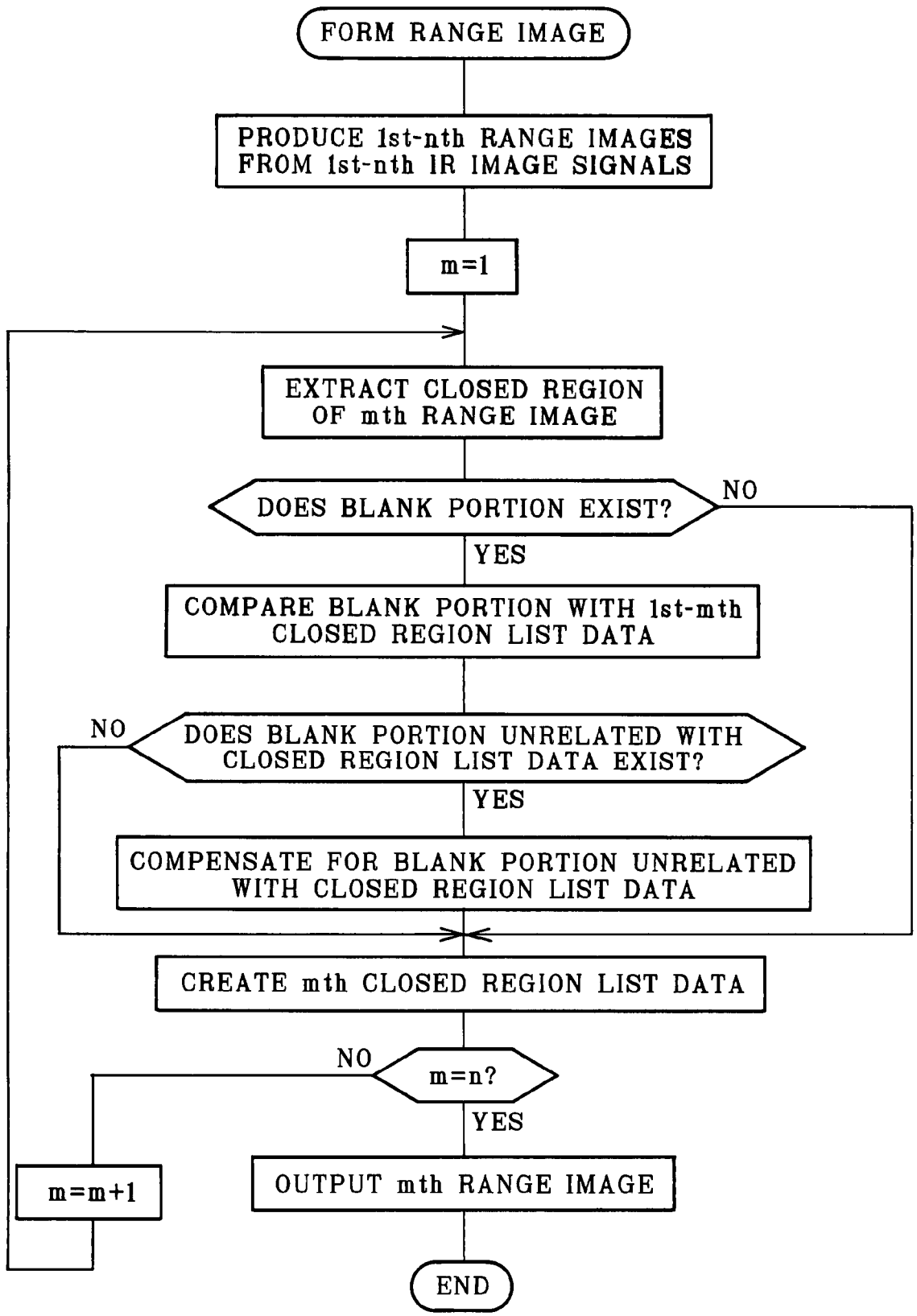
FIG. 7 is a flow chart illustrating the process of forming a range image.

The operation of the above construction is described by referring to FIGS. 6 and 7. In FIG. 4, the apparatus for image taking 2 starts image taking of the small object or first object 24 and the second object 25. The IRED 3, the visible light image pickup device 6, the high speed shutter 7 and the infrared image pickup device 8 of FIG. 1 are operated to output a visible image signal and first and second infrared image signals. In FIGS. 5A, 5B, 5C and 5D, the signal processor 9 produces visible light image according to the visible image signal, and produces the first and second range images 31 and 32 according to the first and second infrared image signals. Information of the first and second range images 31 and 32 is transmitted to the image processor 11.

A counter (not shown) is included in the image processor 11. The image processor 11 sets the value 1 (one) at the count number m of the counter. The closed region extractor 35 reads the first range image 31 and extracts a closed region of which a contour is closed. In FIG. 5B, data derived from the small object or first object 24 is part of the first range image 31. The closed region 42 being extracted represents the contour of the first object 24.

The blank determiner 36 searches blanks from the closed region 42 extracted by the closed region extractor 35, and if any, detects their position and shape. The closed region 42 of the embodiment does not have a blank, so that first closed region list data is created by the list data generator 39 as closed region attribute data. Note that evaluation is carried out for blanks in comparison with closed region list data if a blank exists in the closed region 42. However, no closed region list data has been created before processing of the first range image 31. So all of the blanks are compensated for by the compensator 38.

The count number m is compared with the value n which represents the value of distance range, and if there is a difference between those, is stepped up. In FIG. 5C, the closed region 43 is extracted from the second range image 32. The blank portions 46-48 in the closed region 43 are designated. The comparison unit 37 evaluates the blank portions 46-48 by comparison with the first closed region list data, and designates target blanks not corresponding to the closed region 42. In this situation, the blank portion 47 corresponds to the closed region 42, so the blank portions 46 and 48 are target blanks of compensation.

The compensator 38 compensates for pixels in the blank portions 46 and 48 by use of pixels of portions adjacent to the blank portions 46 and 48. In FIG. 5D, the second range image 32 after the compensation for the blank portions 46 and 48 is created. Therefore, a suitable range image can be obtained, because the blank obtained by a certain object between the image taking position and the distance range is not compensated for.

The visible light image created by the signal processor 9 and the second range image after the compensation of the compensator 38 are input to the visible light image extractor 12. The visible light image extractor 12 derives pixels corresponding to the closed region 43 of the second range image 32 from the visible light image, and creates a range extraction image as image within the second distance range.

In the above embodiment, the infrared image pickup device 8 is separate from the visible light image pickup device 6 in the apparatus for image taking. However, a single image pickup device may be used inclusive of the R, G, B and IR pixels in combination. In the above embodiment, the apparatus for image taking includes the range image sensor. Also, a range image sensor of the invention may be a single unit without apparatus for image taking. The range image sensor may not include the visible light image pickup device 6.

The apparatus for image taking 2 of the invention may be a three dimensional (3D) camera. A camera of the invention may be a digital still camera or the like for image taking of a still picture, and may be a video camera for image taking of a motion picture. Examples of the apparatus for image taking 2 can be electronic optical instruments of various purposes.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A range image producing method of producing a range image in which a distance is represented with a pixel value by image taking of a scene containing a principal object from an image taking position with an image pickup device, comprising steps of:
    applying light modulated at a predetermined period to said scene;
    determining a first distance range and a second distance range, wherein said first distance range is from an image taking position to a point short of said principal object, and said second distance range is a distance range defined by eliminating said first distance range from a range between said image taking position and said principal object;
    receiving said light reflected by an object located in a first distance range with said image pickup device in a reception sequence and reception time according to said first distance range, to output a first image signal;
    receiving said light reflected by said principal object with said image pickup device in a reception sequence and reception time according to said second distance range, to output a second image signal;
    forming a first range image and a second range image according to respectively said first and second image signals; and
    designating blank portions within said second range image by comparison of said first and second range images, to compensate for said blank portions for forming said range image.

2. A range image producing method as defined in claim 1, wherein said blank portions are portions derived from low reflectance in said principal object.

3. A range image producing method as defined in claim 1, wherein said range image forming step includes:
    a) extracting a first closed region disposed in said first range image and having a closed contour;
    b) generating closed region data of information of a position and form of said first closed region;
    c) extracting a second closed region disposed in said second range image and having a closed contour;
    d) determining blank portions from said second closed region;
    e) comparing said blank portions with said closed region data, to designate a blank portion unrelated with said closed region data;
    f) compensating for said blank portion unrelated with said closed region data.

4. A range image producing method as defined in claim 3, wherein said first closed region is derived from a small object in a micro size located in said first distance range.

5. A range image producing method as defined in claim 1, wherein in said light applying step, infrared rays are emitted, and said first and second range images are photographed by response to said infrared rays.

6. A range image producing method as defined in claim 5, further comprising steps of:
    image taking of said scene with a visible light image pickup device, to form a visible light image; and
    extracting an image of said principal object from said visible light image according to said second range image.

7. An apparatus for image taking and for producing a range image in which a distance is represented with a pixel value by image taking of a scene containing a principal object from an image taking position with an image pickup device, comprising:
    a light source for applying light modulated at a predetermined period to said scene;
    a light reception control unit for changing over a reception sequence and reception time between a first receiving condition for a first distance range and a second receiving condition for a second distance range in a scanning period of one frame, to cause said image pickup device to output first and second image signals associated with said first and second receiving conditions, wherein said first distance range is from an image taking position to a point short of said principal object, and said second distance range is a distance range defined by eliminating said first distance range from a range between said image taking position and said principal object;
    an image forming unit for forming a first range image and a second range image according to respectively said first and second image signals; and
    an image processor for designating blank portions within said second range image by comparison of said first and second range images, to compensate for said blank portions for forming said range image.

8. An apparatus for image taking as defined in claim 7, wherein said image processor includes:
- a closed region extractor for extracting a first closed region disposed in said first range image and having a closed contour, and a second closed region disposed in said second range image and having a closed contour;
- a data generator for generating closed region data of information of a position and form of said first closed region;
- a blank determiner for determining blank portions from said second closed region;
- a comparison unit for comparing said blank portions with said closed region data, to designate a blank portion unrelated with said closed region data;
- a compensator for compensating for said blank portion unrelated with said closed region data among said blank portions.

9. An apparatus for image taking as defined in claim 8, wherein said light source includes an infrared light emitting diode, and said image pickup device is an infrared image pickup device for image taking in response to infrared rays.

10. An apparatus for image taking, comprising:
- an image taking lens for focusing light from a scene containing a principal object;
- a visible light image pickup device for receiving said light from said scene, to output a visible image signal by photoelectric conversion;
- a light source for applying infrared rays modulated at a predetermined period to said scene;
- path splitting optics disposed between said image taking lens and said visible light image pickup device;
- an infrared image pickup device, disposed in a light path of split of said path splitting optics, for carrying out photoelectric conversion of said infrared rays reflected by said object in said scene, to output an infrared image signal;
- a light reception control unit for changing over a reception sequence and reception time between a first receiving condition for a first distance range and a second receiving condition for a second distance range in a scanning period of one frame, to cause said infrared image pickup device to output first and second infrared image signals associated with said first and second receiving conditions, wherein said first distance range is from an image taking position to a point short of said principal object, and said second distance range is a distance range defined by eliminating said first distance range from a range between said image taking position and said principal object;
- an image forming unit for forming a visible light image according to said visible image signal, and for forming a first range image and a second range image according to respectively said first and second infrared image signals;
- an image processor for designating blank portions within said second range image by comparison of said first and second range images, to compensate for said blank portions for forming said range image; and
- a visible light image extractor for extracting an image from said visible light image according to said second range image.

11. An apparatus for image taking as defined in claim 10, wherein said image processor includes:
- a closed region extractor for extracting a first closed region disposed in said first range image and having a closed contour, and a second closed region disposed in said second range image and having a closed contour;
- a data generator for generating closed region data of information of a position and form of said first closed region;
- a blank determiner for determining blank portions from said second closed region;
- a comparison unit for comparing said blank portions with said closed region data, to designate a blank portion unrelated with said closed region data;
- a compensator for compensating for said blank portion unrelated with said closed region data among said blank portions.

* * * * *